United States Patent [19]

Fisher et al.

[11] 4,397,435

[45] Aug. 9, 1983

[54] CABLE SUPPORTING AND SPACING DEVICE

[75] Inventors: Richard W. Fisher, Rahway, N.J.; Frank A. Cristell, 205 E. Inman Ave., Rahway, N.J. 07065

[73] Assignee: Frank A. Cristell, Colonia, N.J.

[21] Appl. No.: 332,649

[22] Filed: Dec. 21, 1981

[51] Int. Cl.³ .............................................. F16L 3/00
[52] U.S. Cl. .............................................. 248/61; 24/21
[58] Field of Search .................... 248/61, 62, 63, 58, 248/73, 231, 74 R; 174/41; 24/23 R, 23 B, 21, 22

[56] References Cited

U.S. PATENT DOCUMENTS

| | | | |
|---|---|---|---|
| 2,445,758 | 7/1948 | Benda | 248/61 |
| 2,651,484 | 9/1953 | Marchetti | 248/61 |
| 3,173,638 | 3/1965 | Neale | 248/61 |
| 3,668,744 | 6/1972 | Moody et al. | 24/23 B |
| 4,094,612 | 6/1978 | Krieg | 248/231 |
| 4,341,029 | 7/1982 | Heard | 248/231 |

Primary Examiner—William H. Schultz
Assistant Examiner—Ramon O. Ramirez
Attorney, Agent, or Firm—Robert D. Farkas

[57] ABSTRACT

A cable supporting and spacing device utilizes a block of insulating material to space apart two cables, when the device and portions of the cables are partially encased within a closed loop formed by a flexible strap. The device is provided with at least a pair of projections extending outwardly from the surface thereof for "snap-in" like engagement of the strap to the block, thereby facilitating convenient installation of the device when installed between the two separated cable portions.

10 Claims, 13 Drawing Figures

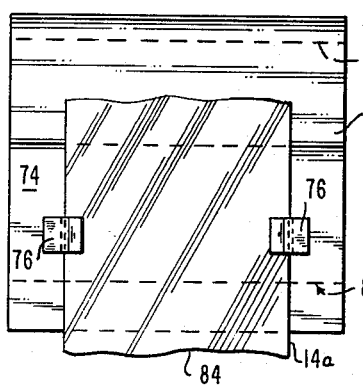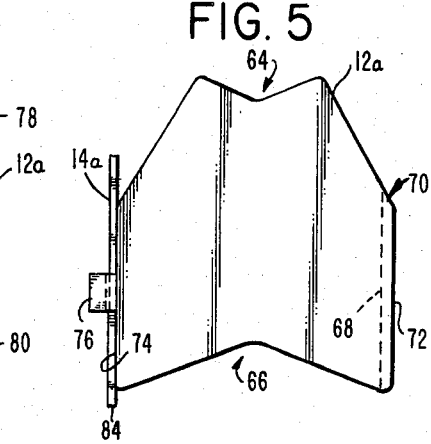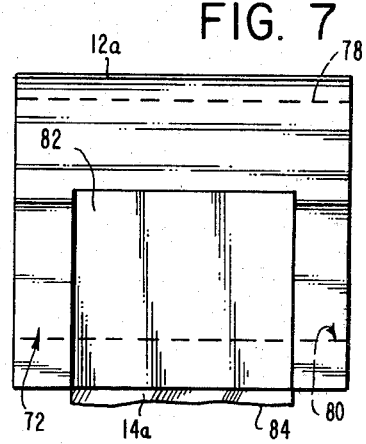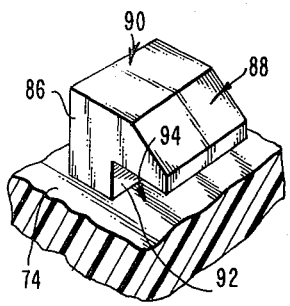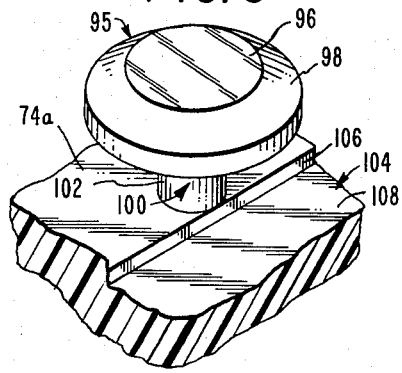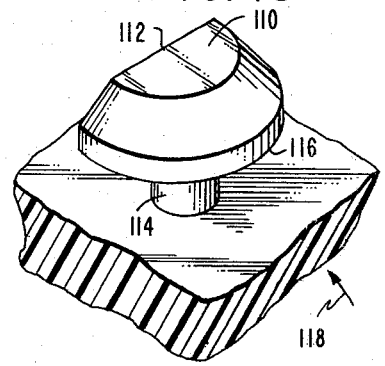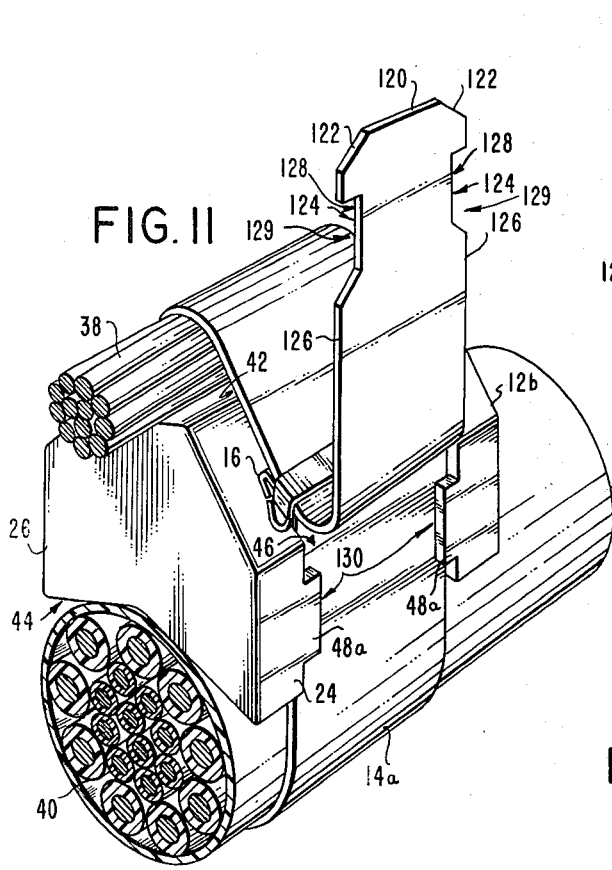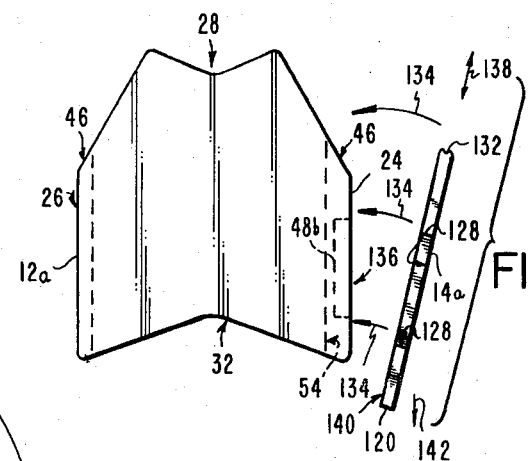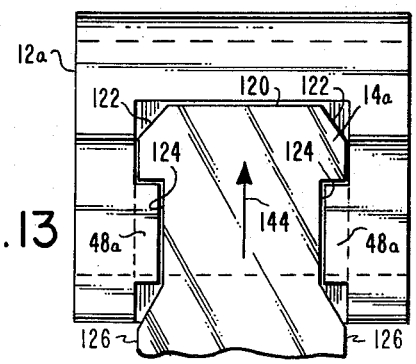

CABLE SUPPORTING AND SPACING DEVICE

BACKGROUND OF THE INVENTION

1. The Field of the Invention

This invention relates to cable supporting and spacing devices and more particularly to that class of supporting device for use in outdoor installations where one or more cable runs are supported from and depend downwardly from an overhead supporting cable.

2. Description of the Prior Art

The prior art includes a variety of supporting and spacing devices useful in supporting electrical conductors in an outdoor environment. Popular in the class of cable supporting devices is a hollow body, formed from a plastic material, having a pair of opposed trough-like grooves located in an uppermost and lowermost surface, for receiving therein the supporting cable and the supported cable therebelow. A metallic strap, having a belt-loop-like end is installed about the plastic block and the uppermost surface of the uppermost cable, as well as the lowermost surface of the lowermost conductor. Such strap is provided having a loop-like end, through which the other free end of the strap is inserted. By bending a portion of the strap emanating outwardly from the loop-like end, the strap is locked into position, causing the two cables to reside in the trough in spaced-apart secure relationship. However, such prior art devices are difficult to install, since the free end of the strap must be threadingly engaged to the strap-bearing end of the metal band. The threading operation must take place with the block disposed in the approximate use position, and with both cables or conductors manually positioned in the final locations, all during the time that the metal band is threaded and tightened.

SUMMARY OF THE INVENTION

A primary object of the present invention is to provide a cable supporting and spacing device which is easy to install, in field applications, without the use of tools and without requiring the installer to perform complicated manual maneuvers during the installing process.

Another object of the present invention is to provide an inexpensive cable supporting device which is capable of maintaining the spacing insulated block, in a defined parallel arrangement with the two cables associated therewith, before and during the installing process.

Still another object of the present invention is to provide a cable spacing device employing two smooth trough-like surfaces to engage opposed cables and conductors, thereby eliminating sharp edge contact with the cables.

Yet another object of the present invention is to provide a unitary cable supporting and spacing device which positions its associated encircling band automatically at the correct location, insuring that the spacer and the cables are disposed in parallel relationship at all times.

Still yet another object of the present invention is to provide a cable supporting and spacing device which can be easily molded, inexpensively manufactured, and is not fragile in its construction.

These objects, as well as other objects of the present invention, will become more readily apparent after reading the following description of the accompanying drawings.

BRIEF DESCRIPTION OF THE DRAWINGS

FIG. 5 is an end elevation view of an alternate embodiment of the present invention.

FIG. 6 is a side elevation view of the apparatus shown in FIG. 5.

FIG. 7 is another side elevation view of a portion of the apparatus shown in FIG. 5.

FIG. 8 is a perspective view of an alternate embodiment of the apparatus shown in FIG. 5.

FIG. 9 is a perspective view of an alternate embodiment of a portion of the apparatus shown in FIG. 5.

FIG. 10 is a perspective view of an alternate embodiment of a portion of the apparatus shown in FIG. 5.

FIG. 11 is a perspective view of another embodiment of the present invention.

FIG. 12 is an end elevation view of a portion of the apparatus shown in FIG. 11.

FIG. 13 is a side elevation view of a portion of the apparatus shown in FIG. 11.

DESCRIPTION OF THE PREFERRED EMBODIMENT

Figure 1:
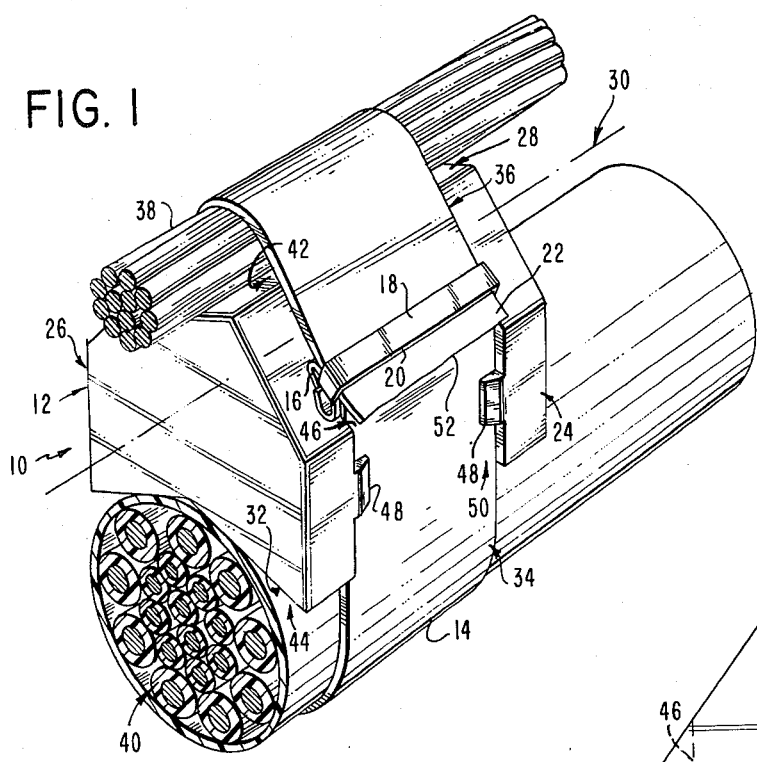
FIG. 1 is a perspective view of an embodiment of the present invention.

The structure and method of fabrication of the present invention is applicable to a cable supporting and spacing device employing a solid plastic-like body, made from a plastic material, such as polypropylene foam, of the rigid variety, being substantially devoid of voids or cavities. Such plastic material should possess good weathering characteristics, be resistant to ultraviolet rays, and be usable in a wide spectrum of ambient temperatures. In general, such solid plastic block should be provided having a pair of opposed troughs, each being located on opposite surfaces of the block, and each extending substantially parallel to each other and the longitudinal axis of the block, so as to form in cross section, a concave-like elongated pair of channels. One of the trough-like channels should have a smaller opening than the other, so that the smaller mouthed trough is useful in engagement with a small diameter supporting cable, such as a galvanized multi-strand bare steel wire assembly. The lowermost trough, when the device is positioned in a use position, contains a wider mouth opening of its trough or channel, than the uppermost trough. The operating cable or conduit, supported by the present invention, resides in the lowermost trough, such that the lowermost cable has its longitudinal axis extending parallel to the longitudinal axis of the lowermost trough and parallel to the uppermost trough whose longitudinal axis is parallel to the longitudinal axis of the supporting wire, partly nestled therewithin.

A series of block-like devices are installed along a free run of supporting cable and useful or conduit or operating cable, so as to suspend the operating cable substantially parallel and directly below the supporting cable.

In order to secure the assembly of a portion of the uppermost cable, and the block, to a portion of the lowermost cable, a metallic or other bendable-like band is employed. Here, the band has provided, at one end, a belt-loop-like opening, fabricated from a rigid material. The belt-loop-like opening extends parallel to the width of the band and normal to the longitudinal axis thereof. The belt-loop-like opening has a width equal to or greater than the remaining width portions of the band, such that the free end of the band may be inserted into the belt-loop-like fitment and so that the end of the band carrying the loop-like end thereon may be positioned anywhere along the length of the remaining portions of the band when the free end of the band is passed through the loop-like opening and the band is pulled taut. In this position, the band portion extending outwardly from a closed loop formed by the band, may be bent so as to preclude the loop-like section of the band formed thereby, from enlarging. It is in such position that the band engages a small portion of the length of the supporting cable, two opposed faces of the block, and a small portion of the operating cable. The free end of the band may be bent backwards on the portion of the band encircling the two wire-like structures and the block.

The two portions of the band engaging the opposed pair of faces of the block, should be positioned in juxtaposed spaced-apart relationship, and located parallel to one another, provided that both pairs of opposed lateral surfaces of the block, contacting the band portions, are in two planes—parallel to one another. If desired, one or both of such opposed faces of the block, adapted to contact portions of the closed loop portion of the band, when tightened, may be grooved. When so grooved, the portion of the block having such a groove receives a portion of the band contacting the base of the groove. The groove is provided having a width somewhat larger than the width of the band, so that the band is positioned within the groove, prohibiting the band from side to side motion, as well as permitting the longitudinal axis of the band to be positioned other than transverse to the longitudinal axis of the block. In utilizing one or two band receiving grooves, the block is further secured against accidental dislodgment during the assembly process, thereby insuring that the entirety of the length of the block is positioned under the band and facilitating the tightening process of the band, at a selected location along the length of the operated cable and its supporting cable.

The present invention also provides for at least two hook-like devices, which are positioned on one of the opposed lateral surfaces of the block, at locations along the line extending parallel to the longitudinal axis of the block. Part of each of the hook-like devices extend over the area adapted for receiving the metallic band. The hook-like portions of the apparatus extend slightly over opposed marginal edges of the metallic band, facilitating the insertion of the metallic band by a simple application of an inward directed force, applied manually to the surface of the metallic band positioned between the pair of projections, when the metallic band is placed over the hook-like projections. A snap-in effect takes place, engaging the band then in contacting relationship with the portion of the block designed to receive the band when tightened.

The hook-like projections may be positioned so as to have their hook-like ends extending over the groove that may be located in one or both sides of the body. In those cases where no groove is employed, the hook-like end of the projections is positioned at a location on one or both opposed side surfaces of the body, so as to substantially center the band along the length of the body. Such pair of opposed surfaces extend substantially parallel to the longitudinal axis of the body and may extend intermediate the uppermost and lowermost supporting and supported cable receiving trough-like grooves.

In an alternate embodiment, the band itself may be provided having a pair of notches located on opposed marginal edges thereof, at opposite locations, adjacent the free end of the band. In such construction, the band may be attached to the block by simply positioning the notch bearing portions of the band over the hook-like pair of projections. A modest force applied to the outside surface of the band causes the band to communicate with one of the side surfaces of the body, without requiring any flexure of the band. Lateral displacement of the band, disposing the pair of notches out of alignment with the two hook-like projections, prevents the band from accidental dislodgment thereafter. This arrangement may be employed for blocks that are provided with band receiving grooves or for blocks that do not utilize such grooves.

The modified band, containing the pair of notches, after engagement with two hook-like projections on one opposed side surface of the block, may be manipulated so as to position the opposed notch-bearing portions of the band, located near its free end, so as to be over another pair of hook-like projections, located on the opposed side surface of the block. In such application, the band will ultimately reside in two captured positions, on opposite sides of the block and may not be removed therefrom excepting by positioning the notches at the locations of the pairs of hook-like projections.

The projections may be shaped so as to resemble an L-shaped body, the free leg of which is chamfered on its uppermost and endmost surfaces, facilitating the easy insertion and hence—the difficult removal of the band under the hook-like end of such projection. Alternatively, a disc-like projection may be employed, simulating a flat disc residing on a post. The uppermost edge of the flat disc, adjacent the perimeter of the disc, is chamfered, again facilitating the easy insertion and difficult removal of the band adapted to be captured under the lateral surface of the disc-like structure and the solid plastic body. Alternatively, the hook-like projection may be resemble a semi-circular plate portion secured to a post portion, where the uppermost marginal edge of the semi-circular disc portion is chamfered. All of the aforementioned chamfered hook-like projections may be utilized on opposed side surfaces of a body, wherein such body is provided with or without a groove.

Now referring to the figures, and more particularly to the embodiment illustrated in FIG. 1 showing the present invention 10 comprising body 12 to which is attached strap or band 14. End 16 of band 14 is attached to loop 18, in which portion 20, of band 14, passes. Portion 20 of band 14 resides over portion 22, of band 14, which is located adjacent end 16 of the band. Surfaces 24 and 26 of body 12 are disposed opposite one another. Uppermost trough 28 extends parallel to longitudinal axis 30 of body 12. Lowermost trough 32 also extends parallel to longitudinal axis 30. Body 12, as shown, is fabricated from a solid material, as by foam in place molding techniques.

Band 14, in the regions depicted by 34 and 36 form a closed loop, engaging a portion of supporting cable 38 and a portion of supported cable 14, as well as encircling body 12. Supporting cable 38, as shown, may be fabricated from a group of solid steel cables, plated to resist rust and oxidation. The uppermost edges of the clamped portion of supporting cable 38 are forced downwardly into trough-like groove 28, by band 14. Similarly, the uppermost portions of supporting cable 40 are pushed into the narrowest regions of trough-like groove 32 by band 14. As can be seen, both trough-like grooves 28 and 32 are provided having open mouth portions 42 and 44 respectively, each being substantially larger than required for cable 38 and supported cable 40. This is so, to permit larger diameter supporting cables 38 and larger diameter supported cables 40 over those shown, to be utilized by the same apparatus.

Block 12 is provided having groove 46 disposed in side face 24. Hook-like projections 48 extend over the open mouth region 50, of groove 46, and over portions of band 14, preventing the release of band 14 from groove 46.

Free end 52 of band 14 extends outwardly from the loop-like receiving portion 18, located at end 16 of band 14. Free end 52 may be bent upwardly, away from open mouth portion 44 of lowermost trough-like groove 32, preventing lowermost supported cable 40, as well as uppermost supporting cable 38 from their locked-in positions in their respective trough-like grooves.

Figure 2:
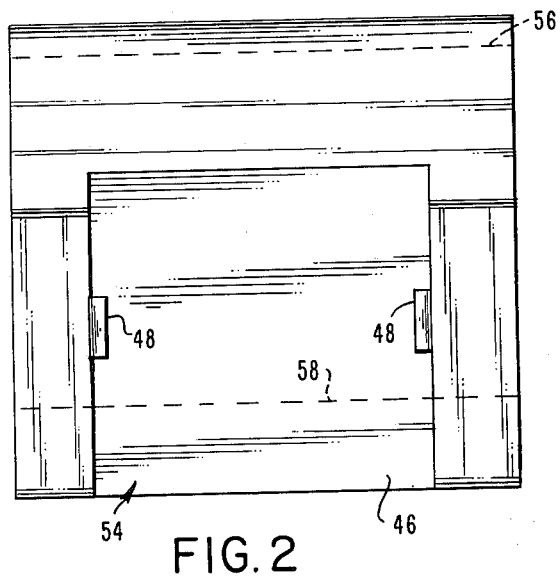
FIG. 2 is a side elevation view of a portion of the apparatus shown in FIG. 1.

FIG. 2 illustrates base 54 of groove 46 partially concealed by hook-like projections 48. Dotted lines 56 delineate the base of trough-like groove 28. Similarly, dotted lines 58 delineate the base of trough-like groove 32.

Figure 3:
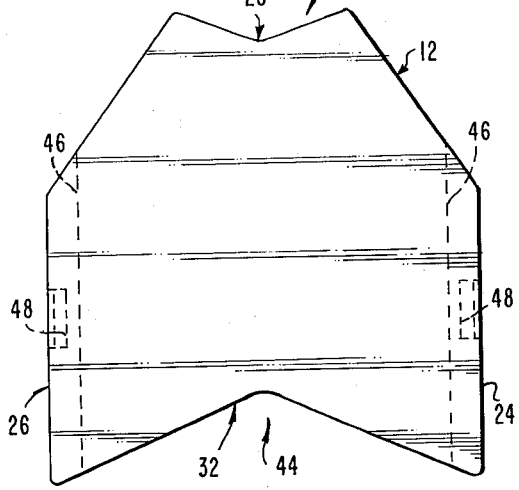
FIG. 3 is an end elevation view of a portion of the apparatus shown in FIG. 1.

As shown in FIG. 3, block 12 is provided having a groove 46 located in opposed side faces 24 and 26, each being provided with a pair of projections 48.

Figure 4:
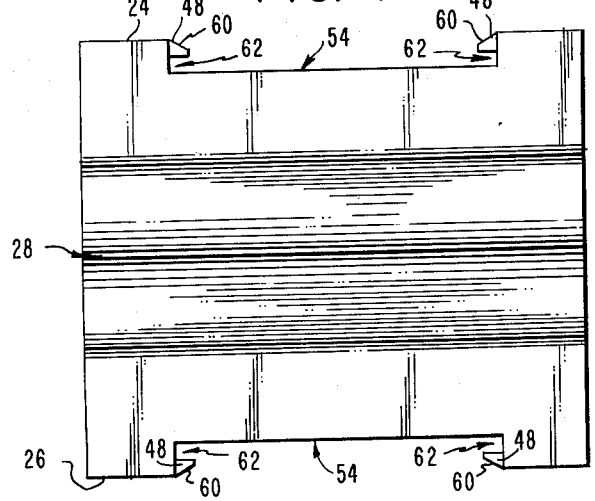
FIG. 4 is a plan view of a portion of the apparatus shown in FIG. 1.

As can be seen in FIG. 4, projections 48 are provided having a ramped-like surface 60 disposed on its outermost surface extending at an angle relative to opposed sides 24 and 26, of projections 48. Notch 62 is adapted to receive portions of band 14, shown in FIG. 1, therewithin.

FIG. 5 illustrates block 12a, an alternate embodiment of block 12, shown in FIG. 1. Such block is provided having uppermost trough-like groove 64 and lowermost trough-like groove 66. Dotted lines 68 depict a band receiving groove 70, located in opposed side wall 72. Opposite side wall 74 is provided with outstanding hook-like projection 76, shown partially capturing a portion of band 14a therewithin.

FIG. 6 illustrates two hook-like projections 76 located on surface 74 of block 12a. Dotted lines 78 depict the base of the trough-like groove 64. Dotted lines 80 depict the base of trough-like groove 66, shown in FIG. 5.

FIG. 7 illustrates base 82 of groove 70, as viewed from the side of block 12a having opposed side wall 72. The lowermost broken away portion 84, of band 14a, is shown extending below body 12a.

FIG. 8 illustrates a typical side wall, herein shown as surface 74. L-shaped projection 86 extends outwardly from surface 74 and is provided having a chamfered surface 88 extending between outermost surface 90 of the L-shaped hook-like projection 86 and the lowermost surface 92, of the free leg of such projection. Cavity 94, so formed, permits the introduction of a portion of band 14a, therewithin, and for retention in cavity 94 by having a marginal edge of band 14a displaced downwardly, along ramp surface 88, and followed by such marginal edge being captured within cavity 94.

FIG. 9 illustrates an alternate embodiment of a surface mounted projection 95, similar to projection 86, and serving the same purpose. Chamfered edge 98 extends around the plate-like perimeter of projection 95 and provides a hook-like shape 100, by the overhang of the disc-like portion over post-like portion 102. As can be seen, post-like portion 102 may be mounted to an outside surface 74a, of a side surface of block 12a, which is provided with an elongated groove 104. Such elongated groove is provided having side wall 106. Side wall 106 may be equal to or lesser than the thickness of a band, not shown, utilizable for insertion under the disc-like portion of hook-like projection 95 and for capturing on engaging surface 108—the base of groove 104.

FIG. 10 illustrates a semi-circular disc-like portion 110 of hook-like projection 112, being supported on post-like portion 114. Surface 74 and undersurface 116, of disc-like portion 110, form opposed lateral surfaces for retaining a portion of band 14a, not shown, thereinbetween. The band portion, not shown, cannot move unlimitedly in the direction of arrow 118, before same is stopped by post portion 114.

FIG. 11 illustrates block 12b, being a variant of block 12, shown in FIG. 1. Block 12b is identical in all respects to block 12, excepting that projections 48a are devoid of the ramp-like surfaces, disposed adjacent to outermost surfaces 24, shown in FIG. 4 as surface 60. In FIG. 11, projections 48a are simply rectangular in shape, extending partly over groove 46. Band 14a, shown in FIG. 11, is different from band 14, as shown in FIG. 1, in that free end 120 is shown having ramped-like edges 122 and is provided with notches 124 disposed opposite one another on opposed marginal edges 126 of band 14a. Notches 124 are provided having an open mouth portion 129 and a base portion 128. Open mouth portion 129 and base portion 128 are designed to be longer than length 130 of projections 48a. In all other respects block 12b and band 14a are equivalent to block 12 and band 14—shown in FIG. 1 for the side 24.

FIG. 12 illustrates block 12a, showing projection 48a being depicted by dotted lines 48b. Side face 26 is shown devoid of projections but is provided having groove 46. Groove 46 is provided for side face 24. Band 14a is shown having its free end 120 and its broken end 132 located a distance away from surface 24. By moving band 14a, in the direction of arrows 134, it can be seen that band 14a communicates with surface 136 of projection 48a. By approximate alignment, in the direction of arrows 138, band 14a may have the base of notches 124, shown as solid lines 128, aligned outwardly from the ends of projection 48a—depicted in FIG. 12 by dotted lines 48b. When this occurs, continued moving force, exerted in the direction of arrows 134, permits innermost surface 140, of band 14a, to contact base surface 54 of groove 46. In such position, not shown, by a movement of band 14a, in the direction of arrow 142, the band becomes locked in by projections 48a and base surface 54 within groove 46.

FIG. 13 illustrates block 12a, showing band 14a in upside down relationship to band 14a, as shown in FIG. 12. In this position, it can be seen that notches 124 are aligned with projections 48a. Band 14a can then be moved in the direction of arrow 144, if desired. The direction of inserting band 14a, as shown in FIG. 12, ends up in the configuration of band 14a, as shown in FIG. 11. FIG. 13 illustrates how projections 48a may be utilized when it is desired to install band 14a in an opposite direction. Block 12a, depicted in FIGS. 11, 12 and 13, may be equipped, as desired, with another pair of projections 48a, disposed on opposite side face 26, if desired. If such be the case, band end 120, of band 14a, may be installed in projections 48a associated with side face 26, by overalignment, over projections 48a, not shown, followed by an inward force directed in the area intermediate notches 124. Alternatively, for the second groove associated with side face 26, free end 120 of band 14a may be threadingly engaged beneath projections 48a.

One of the advantages of the present invention is a cable supporting and spacing device which is easy to install, in field applications, without the use of tools and without requiring the installer to perform complicated manual maneuvers during the installing process.

Another advantage of the present invention is an inexpensive cable supporting device which is capable of maintaining the spacing insulated block in a defined parallel arrangement with the two cables associated therewith, before and during the installing process.

Still another advantage of the present invention is a cable spacing device employing two smooth trough-like surfaces to engage opposed cables and conductors, thereby eliminating sharp edge contact with the cables.

Yet another advantage of the present invention is a unitary cable supporting and spacing device which positions its associated encircling band automatically at the correct location, insuring that the spacer and the cables are disposed in parallel relationship at all times.

A further advantage of the present invention is a cable supporting and spacing device which can be easily molded, inexpensively manufactured, and is not fragile in its construction.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A cable supporting and spacing device comprising the combination of a block and a band, said block having a first and a second opposed side surface, a first elongated trough, said first elongated trough extending for the length of said block in an uppermost surface thereof, a second elongated trough, said second elongated trough extending along said length of said block in a lowermost surface thereof, at least one pair of projections, said at least one pair of projections being secured to said block at one of said first and said second opposed side surfaces, said projections having free ends, said free ends being directed towards one another, said band having one end thereof including a loop-like configuration extending transverse the longitudinal axis of said band, said loop-like configuration having a width greater than the width of said band, said band having a second end, wherein said second end of said band is adapted to pass through said loop-like configuration forming an encircling belt-like loop thereby, said band being bendable, said band having a length wherein said loop-like configuration defines a loop of greater size than the size of said block about its uppermost and lowermost and opposed side surfaces, said at least one pair of projections being positioned a distance apart so as to have portions of said projections extend partly over the marginal edges of said band when said band is positioned encircling said uppermost and said lowermost and said opposed side surfaces of said block.

2. The apparatus as claimed in claim 1 wherein said first trough has a smaller open mouth portion than said second trough.

3. The apparatus as claimed in claim 1 wherein said band is metallic.

4. The apparatus as claimed in claim 1 wherein said block is plastic.

5. The apparatus as claimed in claim 1 wherein said block comprises polypropylene.

6. The apparatus as claimed in claim 1 further comprising at least one groove, said at least one groove being disposed in said side surface of said block at a location intermediate the locations of said at least one pair of projections, wherein the width of said groove is greater than the width of said band, wherein said at least one pair of projections limit said band from accidental disengagement from said groove and wherein the width of said groove positions the portion of said band disposed therewithin from unlimited displacement along the line extending transverse to the longitudinal axis of said band.

7. The apparatus as claimed in claim 1 wherein said at least one pair of projections are provided having ramp-like surfaces disposed adjacent the free ends thereof, said ramp-like surfaces extending at an angle relative to the plane defining said opposed side surface, said at least one pair of projections having innermost surfaces disposed parallel to said opposed side surface.

8. The apparatus as claimed in claim 1 wherein said at least one pair of projections are disposed having their outermost lateral surfaces contiguous with said opposed side surface.

9. The apparatus as claimed in claim 1 wherein said at least one pair of projections each comprise a projection extending outwardly from said opposed side surface, said projection including a portion thereof extending outwardly from said opposed side surface and a portion extending substantially parallel to said opposed side surface, forming a hook-like band receiving pocket thereby, said at least one pair of projections being of unitary construction with said block.

10. The apparatus as claimed in claim 1 comprising said band having a pair of notches, each of said pair of notches being disposed in the marginal edges of said band and located opposite one another, said pair of notches being located adjacent said other end of said band, said pair of notches having a length greater than the width of each of said at least a pair of said projections.

* * * * *